United States Patent
Lahiri et al.

(10) Patent No.: US 6,510,022 B1
(45) Date of Patent: Jan. 21, 2003

(54) METHOD FOR SHAPING POLE PIECES OF MAGNETIC HEADS BY CHEMICAL MECHANICAL POLISHING

(75) Inventors: Ashok Lahiri, Mainz (DE); Edward Hin Pong Lee, San Jose, CA (US); Eric James Lee, San Jose, CA (US); Hong Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/504,969

(22) Filed: Feb. 15, 2000

(51) Int. Cl.[7] .................................................. G11B 5/147
(52) U.S. Cl. ......................................................... 360/126
(58) Field of Search ................................. 360/126, 122, 360/125, 317, 318, 234.1, 234.2, 234.3; 29/603.13, 603.14, 603.15; 204/192.2

(56) References Cited

U.S. PATENT DOCUMENTS

| | | | | |
|---|---|---|---|---|
| 4,380,784 A | * | 4/1983 | Desserre et al. | 360/126 |
| 4,386,383 A | * | 5/1983 | Desserre et al. | 360/126 |
| 5,283,942 A | | 2/1994 | Chen et al. | 29/603.18 |
| 5,285,340 A | | 2/1994 | Ju et al. | 360/119 |
| 5,349,745 A | * | 9/1994 | Kawabe et al. | 29/603.18 |
| 5,375,023 A | | 12/1994 | Ju et al. | 360/119 |
| 5,649,351 A | * | 7/1997 | Cole et al. | 29/603.14 |
| 5,802,700 A | | 9/1998 | Chen et al. | 29/603.14 |
| 5,863,448 A | | 1/1999 | Otani et al. | 216/22 |
| 6,072,672 A | * | 6/2000 | Westwood | 360/126 |
| 6,103,073 A | * | 8/2000 | Thayamballi | 204/192.2 |
| 6,108,167 A | * | 8/2000 | Tateyama et al. | 360/126 |
| 6,243,232 B1 | * | 6/2001 | Osaka et al. | 360/234.2 |
| 6,278,579 B1 | * | 8/2001 | Narumi et al. | 360/126 |
| 6,278,580 B1 | * | 8/2001 | Sasaki | 360/126 |

FOREIGN PATENT DOCUMENTS

JP          08180329 A      7/1996

* cited by examiner

Primary Examiner—Hoa T. Nguyen
Assistant Examiner—Chen Tianjie
(74) Attorney, Agent, or Firm—Robert O. Guillot; Intellectual Property Law Offices

(57) ABSTRACT

The thin film magnetic head of the present invention includes an improved P2 pole tip/yoke interface structure. The interface structure includes yoke material that is formed in a concave curved shape at the interface between the P2 pole tip and the yoke, such that a right angle interface between the P2 pole tip and the yoke is eliminated. The process for forming the P2 pole tip/yoke interface includes a second CMP polishing step that is performed on the surface of the write head wafer subsequent to the plating of the P2 pole tip thereon, and subsequent to a first CMP step. This second CMP step utilizes a relatively soft polishing pad and an acidic polishing slurry having a pH within the range of approximately 1 to approximately 5, and preferably approximately 2.5. The acidic polishing slurry contains a chemical agent which preferentially attacks the P2 pole tip material, such that the second CMP step results in the recession of the upper surface of the P2 pole tip relative to the dielectric layer surrounding it, as well as the significant rounding of the upper edges of the dielectric trench in which the P2 pole tip is formed. Thereafter, when the yoke is plated onto the P2 pole tip the rounded upper edges of the dielectric trench result in a concave curved interface between the yoke and the P2 pole tip. The resulting P2 pole tip/yoke interface possesses improved magnetic flux flow control properties and results in decreased side writing. Greater track per inch areal data storage results from the reduced side writing of the improved write head.

10 Claims, 3 Drawing Sheets

METHOD FOR SHAPING POLE PIECES OF MAGNETIC HEADS BY CHEMICAL MECHANICAL POLISHING

BACKGROUND OF THE INVENTION

1. Field of the Invention

The present invention relates generally to thin film magnetic heads and methods for manufacturing such heads, and more particularly to the features of the P2 pole tip/yoke interface of thin film magnetic write head elements and methods for manufacturing the P2 pole tip/yoke interface.

2. Description of the Prior Art

The well known basic components of thin film magnetic write heads include a first pole (P1), a write gap layer, a narrow P2 pole tip, a yoke that is electromagnetically engaged with the P2 pole tip, and electromagnetic coils that generate a magnetic flux that flows between the P1 pole and the P2 pole tip. The width of the P2 pole tip generally defines the track width of the data bits written by the write head. The yoke is generally significantly wider and thicker than the P2 pole tip and it serves to control and focus the flow of magnetic flux generated by the electromagnetic coils of the write head into the P2 pole tip. The flow of magnetic flux between the P1 pole and the P2 pole tip across the write gap influences the magnetic media disposed proximate the write head to record flux changes therein as data bits. Thus, a significant performance characteristic of write heads is the proper controlled flow of magnetic flux from the yoke into the P2 pole tip and across the write gap. Where the magnetic flux flow control is faulty, the magnetic flux can flow directly from the yoke to the P1 pole without passing through the P2 pole tip. This undesirable effect is termed "side writing" as it creates an undesirable noise band on each side of the data track that is written by the P2 pole tip, and the existence and width of the undesirable side band affects the spacing between the data tracks. Where side writing is minimized, such that the width of the side bands is minimized, data tracks can be written closer together such that more tracks per inch (TPI) can be written and the areal data storage of the magnetic media can be increased.

In prior art pole tips of various designs, the P2 pole tip/yoke interface is characterized as a "T" interface. That is, the P2 pole tip is the downward leg of the "T" and the yoke is formed flatly and squarely on top of the P2 pole tip leg. Thus the inner angle between the P2 pole tip and the yoke is approximately a right angle. This right angle P2 pole tip/yoke interface results in less than optimum magnetic flux flow control between the yoke and the P2 pole tip. That is, flow of magnetic flux is somewhat inhibited at the right angle interface, and this can result in side writing when the magnetic flux flows directly from the yoke to the P1 pole, rather than flowing through the P2 pole tip. It is therefore possible to improve the flow of magnetic flux through the P2 pole tip/yoke interface and thus reduce side writing by shaping the interface to remove the right angle joinder of the yoke to the P2 pole tip. The present invention is a write head that includes such an improved P2 pole tip/yoke interface, together with a process for manufacturing it.

SUMMARY OF THE INVENTION

The thin film magnetic head of the present invention includes an improved P2 pole tip/yoke interface structure. The interface structure includes yoke material that is formed in a concave curved shape at the interface between the P2 pole tip and the yoke, such that a right angle interface between the P2 pole tip and the yoke is eliminated.

The process for forming the P2 pole tip/yoke interface includes a second CMP polishing step that is performed on the surface of the write head wafer subsequent to the plating of the P2 pole tip thereon, and subsequent to a first CMP step. This second CMP step utilizes a relatively soft polishing pad and an acidic polishing slurry having a pH within the range of approximately 1 to approximately 5, and preferably approximately 2.5. The acidic polishing slurry contains a chemical agent which preferentially attacks the P2 pole tip material, such that the second CMP step results in the recession of the upper surface of the P2 pole tip relative to the dielectric layer surrounding it, as well as the significant rounding of the upper edges of the dielectric trench in which the P2 pole tip is formed. Thereafter, when the yoke is plated onto the P2 pole tip the rounded upper edges of the dielectric trench result in a concave curved interface between the yoke and the P2 pole tip.

The resulting P2 pole tip/yoke interface possesses improved magnetic flux flow control properties and results in decreased side writing. Greater track per inch areal data storage results from the reduced side writing of the improved write head.

It is an advantage of the magnetic head of the present invention that increased areal data storage is obtained.

It is another advantage of the magnetic head of the present invention that reduced side writing from the write head is obtained.

It is a further advantage of the magnetic head of the present invention that data tracks on magnetic media can be written closer together because the side band noise created by side writing is reduced.

It is a yet another advantage of the magnetic head of the present invention that improved magnetic flux flow control through the P2 pole tip/yolk interface is obtained.

It is an advantage of the process for manufacturing a magnetic head of the present invention that a second CMP polishing step on the write head performed immediately following a first CMP polishing step results in a magnetic head having improved performance characteristics.

It is another advantage of the process for manufacturing a magnetic head of the present invention that a second CMP polishing step on the write head following a first CMP polishing step adds little to the manufacturing time of the write head elements.

It is a further advantage of the process for manufacturing a magnetic head of the present invention that a second CMP polishing step following a first CMP polishing step adds little to the manufacturing expense of the write head elements.

These and other features and advantages of the present invention will become better known and understood upon reading the following detailed description which makes reference to the several figures of the drawings.

IN THE DRAWINGS

DETAILED DESCRIPTION OF THE PREFERRED EMBODIMENTS

Methods for manufacturing magnetic heads involve many process steps, as are generally well known in the prior art, and FIGS. 1–8 and 10–15 generally depict prior art process steps involved in depositing and removing of layers of various materials upon the wafer surface, which steps ultimately result in the creation of a plurality of write head components upon the wafer surface. The write head components are subsequently separated and further processed to become discrete thin film magnetic write heads. It is important to note that not all write head. manufacturing process steps are described herein, but only those process steps deemed significant to the description and understanding of the present invention. Additionally, while the detailed description herein is directed to thin film magnetic write head elements, it is intended that the invention and claims herebelow include thin film magnetic heads that include read head components in addition to the write head components described herein.

As is described in detail herebelow the new write head pole tip includes an improved P2 pole tip/yolk interface that has improved magnetic flux control properties which results in decreased side writing. This allows for an increase in the areal density of data storage on a disk by reducing the width of the noise band between adjacent data tracks, such that the number of tracks per inch (TPI) can be increased. A detailed description of the present invention is next provided.

Figure 1:
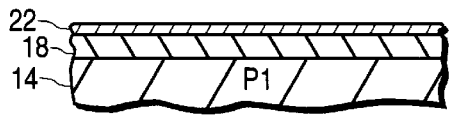
FIG. 1 is a side cross-sectional view presenting a schematic illustration of a portion of a thin film magnetic head disposed on a wafer substrate as configured during a process step executed in the manufacturing thereof, as is known in the prior art.

FIG. 1 is a side cross sectional view presenting a schematic illustration of a portion of one of many write head components that are in the process of being manufactured upon a wafer substrate, and it will serve as the starting point for the description of the present invention. As depicted in FIG. 1, a first pole (P1) 14 has been formed on the wafer surface. Thereafter, a gap layer 18 has been deposited upon the P1 pole tip, and a seed layer 22 has been deposited upon the gap layer 18. The seed layer is generally composed of the same material as a subsequently deposited second pole tip material and serves to provide good adherence of the subsequently deposited P2 pole tip material.

Figure 2:
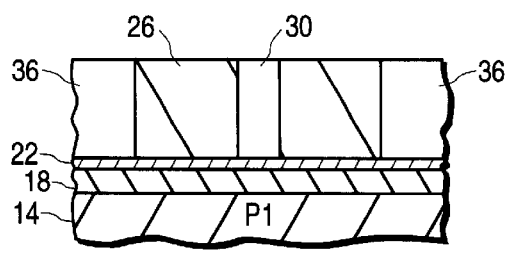
FIGS. 2–8 depict the thin film magnetic write head elements of FIG. 1 in subsequent manufacturing process steps, as are known in the prior art.
Figure 3:
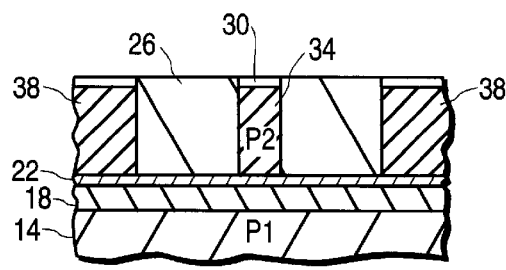

In the next process step, as depicted in FIG. 2, a resist plating frame layer 26 is deposited upon the seed layer 22. Utilizing standard photolithographic processing steps, a hole or trench 30 is formed in the resist layer 26 for the subsequent deposition (typically by electroplating) of the second pole tip (P2) 34. Further openings 36 are formed in the resist plating frame layer 26, as is well known in the art. Thereafter, as depicted in FIG. 3, the material that forms the P2 pole tip 34 is electroplated into the trench 30 typically to a thickness less than the depth of the trench 30, so as to prevent mushrooming of the P2 pole tip and the openings 36 are also plated up with the material 38. The P2 pole tip 34 may be composed of various materials as are known in the art, with a nickel iron (NiFe) composition being specifically, though not necessarily, used in the present invention. Thus the seed layer 22 is also composed of NiFe.

Figure 4:
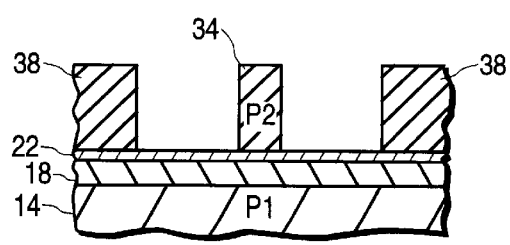
Figure 5:
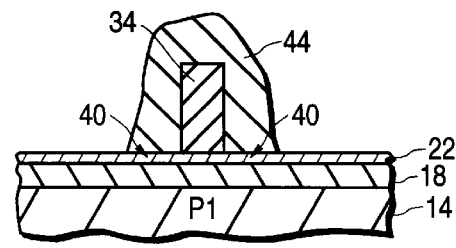
Figure 6:
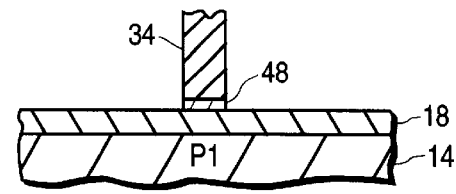

Thereafter, as depicted in FIG. 4, the resist layer 26 is chemically stripped, such that the P2 pole piece 34 the outer frame pieces 38 and the seed layer 22 are exposed. Then, as depicted in FIG. 5, the P2 pole tip and inner portions 40 of the seed layer 22 are covered by a shield layer 44, and a chemical etch process is undertaken to remove the exposed outer frame pieces 38 as well as portions of the seed layer 22. Thereafter, the shield layer 44 is removed and the inner portions 40 of the seed layer are then exposed, and the exposed inner seed layer portions 40 together with any remaining seed layer portions are removed utilizing a sputtering or ion milling tool. FIG. 6 depicts this stage in the manufacturing process, wherein the P2 pole tip 34 and a portion 48 of the seed layer immediately below the pole tip 34 are disposed upon the gap layer 18. It is to be noted that the preceding process step description is a generalization and well known in the prior art. Also, other and different process steps may be utilized to achieve the resulting configuration depicted in FIG. 6.

Figure 7:
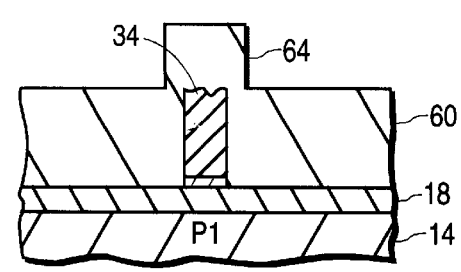
Figure 8:
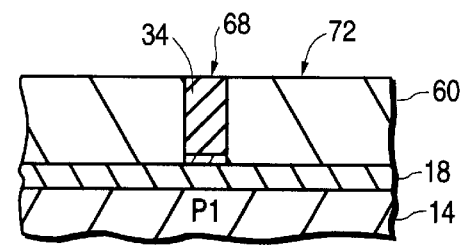

Next, as depicted in FIG. 7, a layer of a dielectric material 60 is deposited on the wafer surface. The layer 60 is typically though not necessarily formed of alumina, and upwardly projecting portions 64 of the alumina layer 60 are formed wherever projecting P2 pole tips are formed on the wafer. A first chemical mechanical polishing (CMP) step is next conducted upon the wafer. The first CMP step utilizes a relatively hard polishing pad and a chemical polishing slurry that removes alumina and NiFe at approximately equal rates. The slurry may have a neutral pH with a pasivating agent such as BTA (benzothiazole), to a higher pH of approximately 10 where a pasivating agent normally is not required. A chemical oxidant may be included in the slurry, and a preferred oxidant is ammonium persulfate. The relatively hard pad preferentially removes the projecting portions 64 and the slurry attacks and remove the alumina 60 and the NiFe that constitutes the P2 pole tip. The first CMP step is conducted until the top surface 68 of each P2 pole tips 34 formed on the wafer is exposed within the polished surface 72 of the alumina layer 60, as is depicted in FIG. 8.

All of the preceding process steps described hereabove and depicted in FIGS. 1 through 8 are known and practiced in the prior art write head pole tip manufacturing processes. They have been described herein to provide a general background for understanding the following process steps that comprise the novel features of the present invention. Specifically, the significant step of the present invention comprises the implementation of a second CMP processing step at this point in the pole tip manufacturing process, as is next described.

Figure 9:
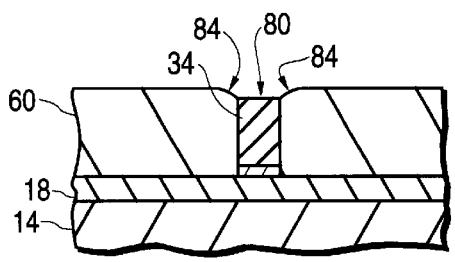
FIG. 9 depicts a new process step of the present invention executed in the manufacturing of the thin film magnetic write head elements of the present invention.

The second CMP step of the present invention involves the utilization of a relatively soft polishing pad along with an acidic polishing slurry. An oxidant, such as ammonium persulfate is preferably included in the acidic polishing slurry. The acidic polishing slurry coupled with the soft polishing pad of the second CMP step create an environment in which the P2 pole tip is preferentially attacked as compared to the alumina. As a result, as depicted in FIG. 9, the second CMP step acts to remove the upper surface 68 of the pole tip 34 to form a recessed P2 pole tip surface 80. Additionally, the polishing action of the second CMP step causes a rounding of the upper edges 84 of the alumina 60 above the surface 80 of the P2 pole tip 34. In the preferred embodiment, the acidic CMP polishing slurry preferably has a pH of from approximately 1 to approximately 5 with a preferred pH of approximately 2.5. Generally, a more acidic polishing slurry will more rapidly attack the NiFe pole tip material as compared to the alumina, and a polishing slurry having a pH lower than approximately 3 will generally cease to significantly remove alumina, whereas a slurry having a pH higher than approximately 5 will remove excess alumina. Thus it is desirable to have a slurry chemistry including a pH that is appropriate to attack the NiFe at an acceptable rate while not attacking the alumina too greatly. Owing to the small dimensions of the P2 pole tip, it is generally desirable that the CMP polishing action of the pole tip be conducted at least as rapidly as the chemical action of the acidic slurry upon the pole tip. Where it is necessary to slow the chemical attack of the acidic slurry upon the pole tip, an oxidation inhibitor such as benzothiazole (BTA) may preferentially be added to the acidic slurry to protect the P2 pole tip from overreactive acid attack during the second CMP polishing step of the present invention. The CMP polishing slurries described herein are available from several commercial sources. One such source is The Cabot Corporation, located in Aurora, Ill.; the preferred acidic slurry of the second CMP step is designated as Semi Sperse W 2000.

Therefore, as depicted in FIG. 9, the result of the second CMP polishing step of the present invention is that the upper surface 80 of the P2 pole tip is recessed into the alumina 60, and the upper edges 84 of the alumina are rounded by the second CMP polishing step. The degree of roundness of the edges 84 is somewhat a function of the width of the P2 pole tip, and where a one micron width P2 pole tip has undergone the second CMP polishing step of the present invention, the pole tip surface 80 is recessed approximately 0.3 microns and the rounded edges 84 of the alumina have a radius of curvature of approximately 0.3 microns.

Figure 12:
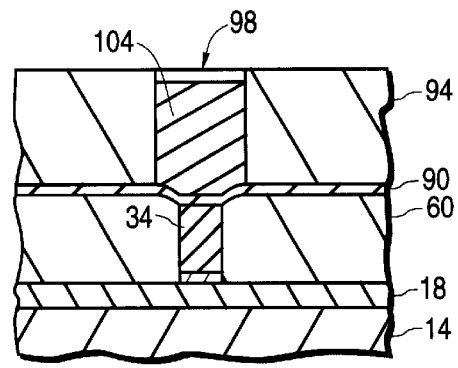
FIGS. 10–15 depict the thin film magnetic write head elements of FIG. 9 in subsequent manufacturing process steps, as are known in the prior art.
Figure 10:
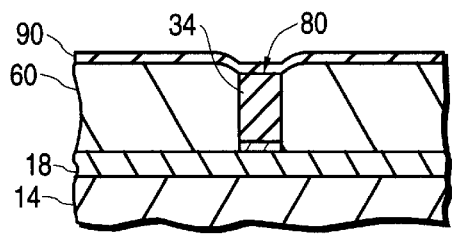
Figure 11:
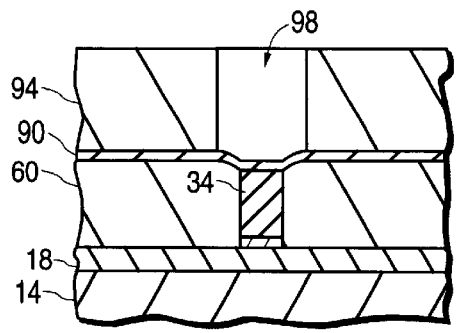

Following the second CMP polishing step of the present invention the electromagnetic coils of the write head are next formed utilizing many process steps that are generally known and utilized in the prior art. These process steps are peripheral to the invention described herein and will not be described in detail. Thereafter, the yoke portion of the write head is formed onto the P2 pole tip. Specifically, as depicted in FIG. 10, a second seed layer 90 is deposited upon the surface of the wafer. The seed layer 90 covers the upper surface 80 of the P2 pole tip and serves to provide good electromagnetic conduction between the yoke (to be formed) and the upper surface 80. Thereafter, as depicted in FIG. 11, a resist layer 94 is deposited upon the seed layer 90 and photolithographic steps are conducted to form a trench 98 into which the yoke will be plated. Thereafter, as depicted in FIG. 12, the yoke 104 is electrochemically plated into the trench 98 of the resist layer 94.

Figure 13:
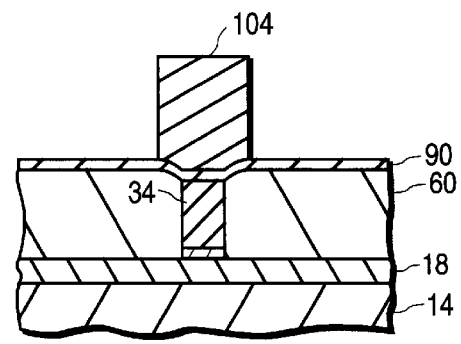
Figure 14:
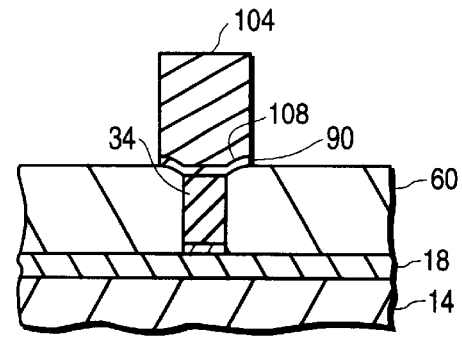
Figure 15:
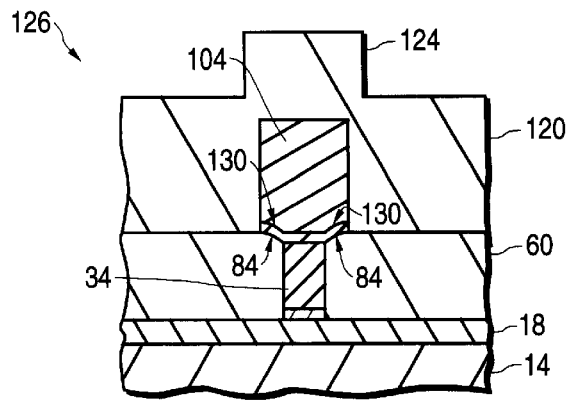

Next, as depicted in FIG. 13, the resist layer 94 is removed to expose the yoke 104 and the second seed layer 90. Thereafter, the exposed seed layer 90 is removed utilizing process steps similar to those described hereabove with regard to the first seed layer 22, as depicted in FIGS. 4, 5 and 6. FIG. 14 depicts the device following the removal of the exposed seed layer 90, such that only the seed layer portions 108 between the P2 pole tip 34 and the yoke 104 remain. Thereafter, as depicted in FIG. 15, a further layer 120 of dielectric material such as alumina is deposited upon the wafer surface, which typically results in the formation of projecting portions 124 of the alumina layer 120. The completed write head 126, with a completed P2 pole tip/yoke interface 128 of the present invention, is depicted in FIG. 15. The significant feature of the P2 pole tip/yoke interface 128 of the present invention is the curved surface 130 proximate the joinder of the P2 pole tip 34 and the yoke 104. Specifically, the rounded upper edges 84 that are created in the second CMP step of the present invention result in corresponding concave rounded edges 130 of the yoke 104 at the interface 128 between the P2 pole tip 34 and the yoke 104. These concave rounded edges 130 of the present invention are to be contrasted with the right angle interface between the P2 pole tip and the yoke as is found in the prior art "T" type P2 pole tips.

Figure 16:
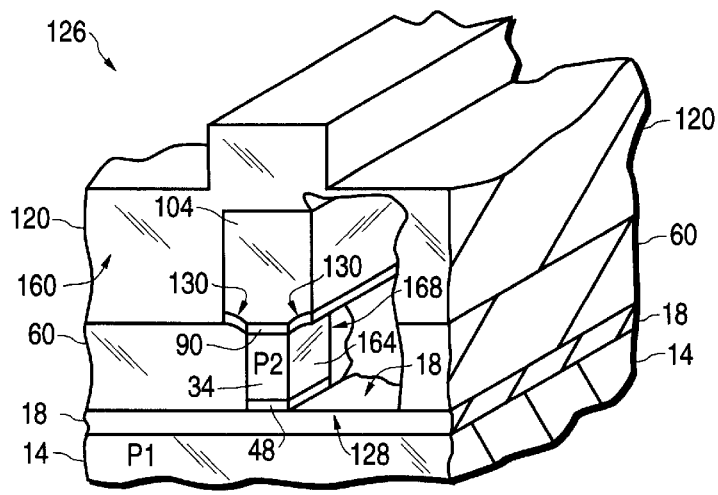
FIG. 16 is a perspective view of the thin film magnetic head of the present invention including the improved P2 pole tip/yoke interface thereof.

To provide a more complete understanding of the present invention an isometric view with cutaway portions of the dielectric layers (60 and 120) of the completed write head 126 of the present invention is presented in FIG. 16. As depicted therein, the air bearing surface (ABS) 160 of the write head 126 includes the P1 pole 14, the gap layer 18, the remaining first seed layer 48, the P2 pole tip 34, the remaining second seed layer 90 and the yoke 104. The concave curved surface 130 of the P2 pole tip/yoke interface 128 appears on the ABS surface and is formed proximate all edges of the joinder between the P2 pole tip 34 and the yoke 104, including the side surfaces 164 of the P2 pole tip 34 and the inner rearward surface 168. The magnetic flux generated within the write head 126 passes through the interface 128 between the yoke 104 and the P2 pole tip 34, such that the interface 128 is both the point of physical engagement and electromagnetic engagement of the yoke 104 with the P2 pole tip 34. An advantage of the P2 pole tip/yoke interface 128 of the present invention is that the magnetic flux from the yoke 104 passes more efficiently into the pole tip 34 than in the prior art "T" type P2 pole tip/yoke interface configurations. Specifically, the sharp interior right angle of the prior art "T" configuration inhibits the efficient magnetic flux conduction between the yoke and the P2 pole tip, and results in undesirable magnetic side writing through the unwanted flow of magnetic flux directly from the yoke 104 to the P1 pole 14, rather than the proper flow of magnetic flux from the yoke 104 through the P2 pole tip 34 to the P1 pole 14. The rounded concave surfaces 130 of the P2 pole tip/yoke interface 128 of the present invention therefore create a more efficient write head that has reduced side writing, because the magnetic flux is more efficiently channeled into the P2 pole tip 34 for the desired flux flow across the write gap layer 18 from the P2 pole tip 34 to the P1 pole 14.

Figure 17:
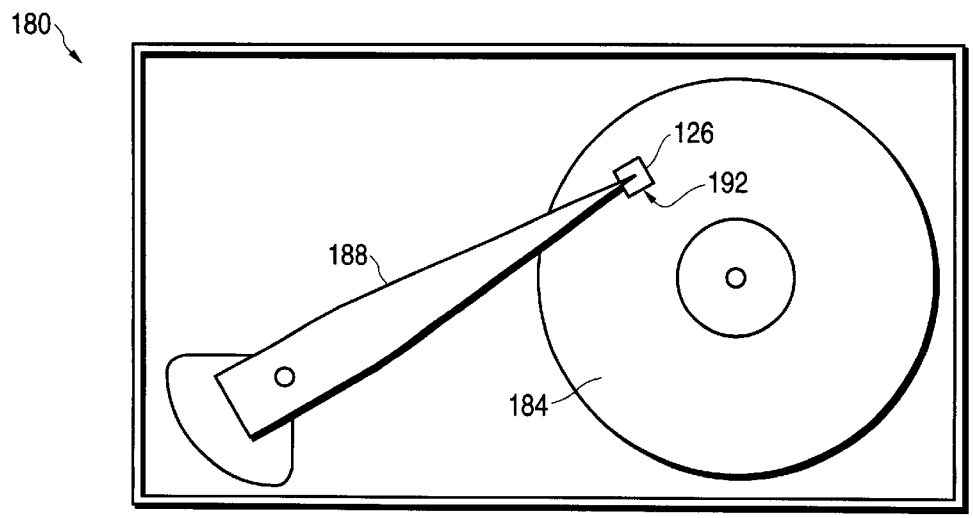
FIG. 17 is a simplified top plan view of a hard disk drive including the magnetic head of the present invention.

A simplified top plan view of a disk drive 180 that includes a thin film magnetic head of the present invention is depicted in FIG. 17. The disk drive 180 includes one or more hard disks 184 and one or more actuator arms 188 that have a slider device 192 mounted thereto. A magnetic head 126 of the present invention is formed on a surface of the slider member utilizing the manufacturing techniques described hereabove. As is well known to those skilled in the art, the disk drive 180 includes additional electromechanical and computerized components (not shown).

While the present invention has been shown and described with regard to certain preferred embodiments, it will be understood by those skilled in the art upon reading the preceding disclosure that certain alterations and modifications in form and detail may be made therein. It is therefore intended by the inventors that the following claims cover all such alterations and modifications that nevertheless include the true spirit and scope of the invention.

What is claimed is:

1. A thin film magnetic head including a slider body having an ABS surface side, comprising:
   a P1 pole having a first surface that is formed proximate said slider body and a second surface that is forward away from said slider body;
   a gap layer being formed proximate said second surface of said P1 pole;
   a P2 pole tip being formed upon said gap layer, said P2 pole tip being disposed within a first insulation layer;

a yoke member being magnetically engaged with said P2 pole tip at an interface that is disposed in part on the ABS surface side, said yoke member being disposed within a second insulation layer, said interface including a concave surface shape portion of said yoke member, said concave surface shape portion of said yoke member being disposed to make contact with said first insulation layer.

2. A thin film magnetic head as described in claim 1 wherein said concave surface shape is formed in an external surface of said yoke member proximate the location of said magnetic engagement of said yoke member with said P2 pole tip.

3. A thin film magnetic head as described in claim 2 wherein said concave surface has a radius of curvature of approximately 0.3 microns.

4. A thin film magnetic head as described in claim 3 wherein said P2 pole tip has a width of approximately 1 micron, and wherein said P2 pole tip is disposed upon a flat gap layer having flat surface portions that extend beyond said P2 pole tip, and wherein said first insulation layer is disposed upon said flat surface portions of said gap layer.

5. A thin film magnetic head as described in claim 2 wherein said concave surface shape is formed proximate all edges of said yoke member that engage said P2 pole tip.

6. A hard disk drive, comprising:
   at least one hard disk being adapted for rotary motion upon a drive device;
   at least one slider device having a slider body portion being adapted to fly over said hard disk; a magnetic head having an ABS surface side being formed on said slider body for writing data on said hard disk; said magnetic head including:
   a P1 pole having a first surface that is formed proximate said slider body and a second surface that is formed away from said slider body;
   a gap layer that is formed proximate said second surface of said P1 pole;
   a P2 pole tip being formed upon said gap layer, said P2 pole tip being disposed within a first insulation layer;
   a yoke member being magnetically engaged with said P2 pole tip at an interface that is disposed in part on the ABS surface side, said yoke member being disposed within a second insulation layer, said interface including a concave surface shape portion of said yoke member, said concave surface shape portion of said yoke member being disposed to make contact with said first insulation layer.

7. A hard disk drive as described in claim 6 wherein said concave surface shape is formed in an external surface of said yoke member proximate the location of said magnetic engagement of said yoke member with said P2 pole tip.

8. A hard disk drive as described in claim 7 wherein said concave surface has a radius of curvature of approximately 0.3 microns.

9. A hard disk drive as described in claim 8 wherein said P2 pole tip has a width of approximately 1 micron, and wherein said P2 pole tip is disposed upon a flat gap layer having flat surface portions that extend beyond said P2 pole tip, and wherein said first insulation layer is disposed upon said flat surface portions of said gap layer.

10. A hard disk drive as described in claim 7 wherein said concave surface shape is formed proximate all edges of said yoke member that engage said P2 pole tip.

* * * * *